United States Patent
Potluri et al.

(10) Patent No.: US 6,792,003 B1
(45) Date of Patent: Sep. 14, 2004

(54) METHOD AND APPARATUS FOR TRANSPORTING AND ALIGNING DATA ACROSS MULTIPLE SERIAL DATA STREAMS

(75) Inventors: Somasekhar Potluri, Sunnyvale, CA (US); Rajesh Gopal Nair, San Jose, CA (US); Van A. Hunter, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/373,135

(22) Filed: Aug. 12, 1999

(51) Int. Cl.[7] ................................................ H04J 3/00
(52) U.S. Cl. .................... 370/476; 370/503; 370/535; 375/365
(58) Field of Search ......................... 370/476, 503, 370/509, 512, 514, 520, 535–542; 375/219, 220, 365, 368

(56) References Cited

U.S. PATENT DOCUMENTS

| | | | |
|---|---|---|---|
| 4,775,987 A | * 10/1988 | Miller | ........................ 370/476 |
| 5,065,396 A | * 11/1991 | Castellano et al. | ......... 370/536 |
| 5,274,635 A | 12/1993 | Rahman et al. | |
| 5,570,356 A | * 10/1996 | Finney et al. | ................ 370/503 |
| 5,610,945 A | * 3/1997 | Gregg et al. | ................. 375/260 |
| 6,167,077 A | * 12/2000 | Ducaroir et al. | ............ 375/219 |

OTHER PUBLICATIONS

Muller, Architecture for a 10–Gigabit Ethernet Standard, pp. 1–26, Jun. 1, 1999.*

* cited by examiner

*Primary Examiner*—Frank Duong
(74) *Attorney, Agent, or Firm*—Blakely Sokoloff Taylor & Zafman

(57) ABSTRACT

A method for transporting and aligning data across a set of serial data streams. The method includes creating a predetermined number of data streams from a first data stream. The first data stream has a first predetermined bit width and each data stream of the predetermined number of data streams has a second predetermined bit width smaller than the first predetermined bit width. In addition, the method includes inserting an alignment pattern in each of the predetermined number of smaller data streams. The predetermined number of smaller data streams are combinable into a data stream having the first predetermined bit width based on the alignment pattern. The method also includes preparing the predetermined number of smaller data streams for transmission. An apparatus for performing the method is also disclosed.

15 Claims, 8 Drawing Sheets

COMMUNICATIONS SYSTEM 100

System

METHOD AND APPARATUS FOR TRANSPORTING AND ALIGNING DATA ACROSS MULTIPLE SERIAL DATA STREAMS

FIELD OF THE INVENTION

This invention relates to circuit communications systems. Specifically, this invention is more particularly directed towards a method and apparatus for transporting and aligning data across multiple serial data streams.

BACKGROUND

Speeds of computer systems have been constantly increasing. As technology improves, computer system designers and engineers constantly struggle to integrate the latest advances. For example, the foundation of all current computer systems is the integrated circuit (IC). Typically, most designs call for one or more ICs to be in communication over one or more buses or links.

Generally, the faster the computer systems are required to perform, the higher the bandwidth requirements are between the different ICs in the system. This applies to all computer systems, such as personal computers, network systems, and embedded systems. For example, in a network system such as a network switch, data may need to be communicated at rates as high as the gigabits per second level. This means that for network switches to communicate with other network switches and network devices at these levels, network switches must process information internally at many times the speed at which data is transmitted or received in the network.

Achieving high communications speed between ICs is instrumental in making high performance systems. One solution is to increase the speed at which ICs communicate with each other over a serial link. However, as the internal operating speeds of ICs are increasing at a much greater rate than may be handled by advances in communication technology, using a single serial link becomes a limitation in IC to IC communications. Multiple serial links may be used to transfer more data between ICs, but mismatches in the alignment in data and other problems limit the speed at which data may be transferred. Therefore, there is a need for providing a robust and effective way to aggregate bandwidths of multiple serial links in order to create very high bandwidths for IC to IC communication.

SUMMARY OF THE INVENTION

The present invention is directed to a method and apparatus for transporting and aligning data across a set of serial data streams. The method includes creating a predetermined number of data streams from a first data stream. The first data stream has a first predetermined bit width and each data stream of the predetermined number of data streams has a second predetermined bit width smaller than the first predetermined bit width. In addition, the method includes inserting an alignment pattern in each of the predetermined number of smaller data streams. The predetermined number of smaller data streams are combinable into a data stream having the first predetermined bit width based on the alignment pattern. The method also includes preparing the predetermined number of smaller data streams for transmission. An apparatus for performing the method is also disclosed.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention is illustrated by way of example and not limitation in the figures of the accompanying drawings in which like references indicated similar elements and in which.

DETAILED DESCRIPTION

In one embodiment, an outgoing 32-bit wide data stream is divided into eight nibble (4-bits) wide data streams. Each nibble wide data stream is converted into a data-aware nibble stream and transmitted to the receiving chip as a serial bit stream. At the receiving chip, the incoming serial data streams are converted back to nibble streams and transformed into nibble-aligned data streams. Then, the eight incoming nibble-aligned data streams are joined to make a 32-bit wide data stream using a first in, first out (FIFO) scheme. This FIFO scheme is highly tolerant to the skew among the eight nibble data streams. Then, the 32-bit wide data stream is converted into 128-bit data stream using a shift register.

In this approach, the receiving IC or device is always locked/aligned to the incoming data stream. If the receiving device loses the lock of the incoming data stream due to any reason, it automatically relocks/realigns as soon as it starts receiving valid data. In addition, this approach has a provision to identify and indicate data errors.

In the present invention, there are no limitations as to the number of serial links that may be combined or the width of each individual streams. In addition, multiple layers of the present invention may be implemented to achieve even higher speeds.

Figure 1:
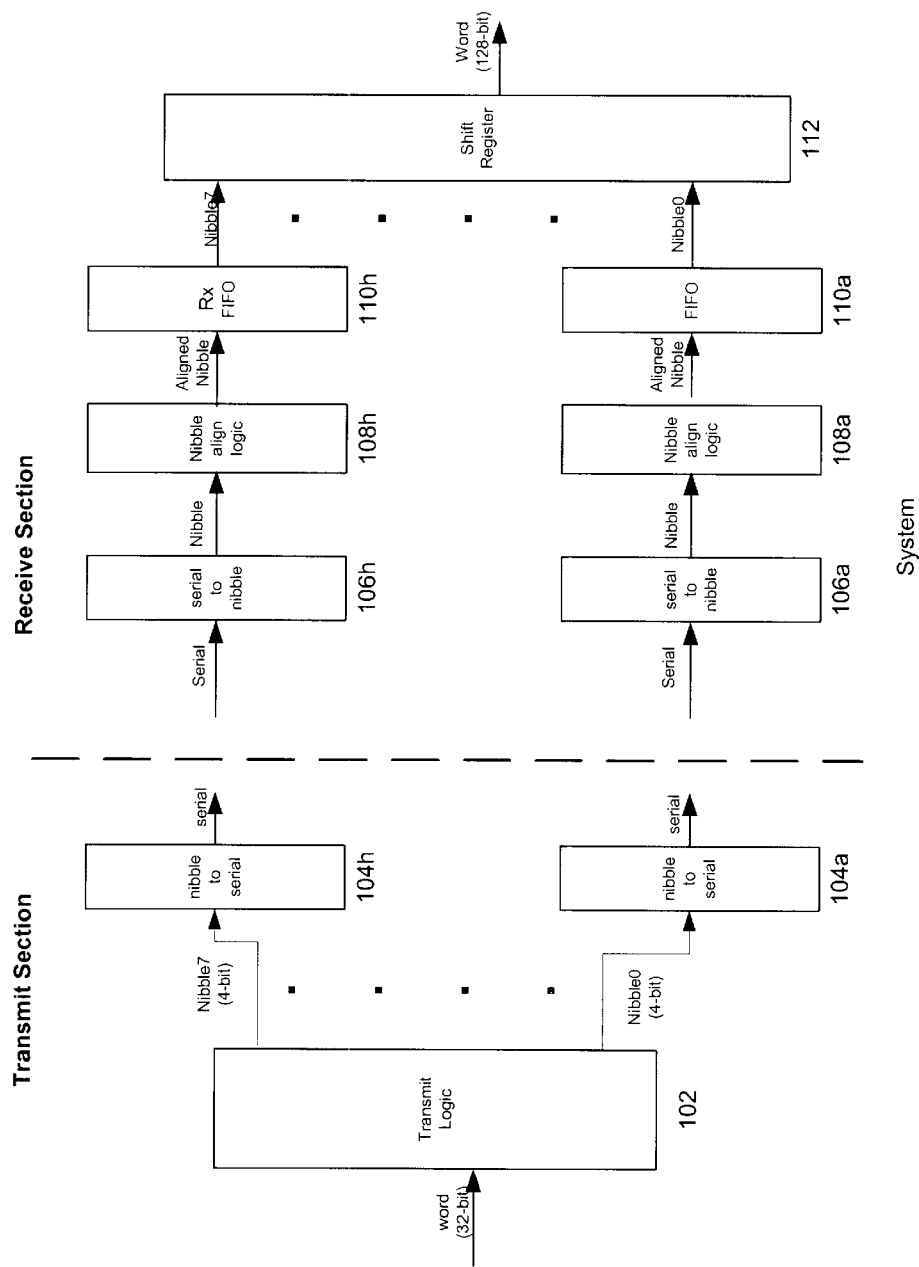
FIG. 1 is a block diagram illustrating transmit and receive sections of a communications system configured in accordance with one embodiment of the present invention.

FIG. 1 illustrates a communications system 100 containing a transmit section and a receive section. The transmit section contains a transmit logic 102 and a set of nibble to serial converters 104a–104h. The transmit section is located in a source IC, while the receive section is located in a destination IC. The receive section contains a set of serial to nibble converters 106a–106h, a set of nibble align logics 108a–108h, a set of receive FIFOs 110a–110h, and a shift register 112.

In the embodiment as illustrated, the transmit section takes the incoming/internal 32-bit wide data stream and transmits that out as eight continuous serial bit streams. The receive section receives the eight serial data streams, extracts valid data, aggregates the data and produces a 128-bit wide data stream.

Figure 2:
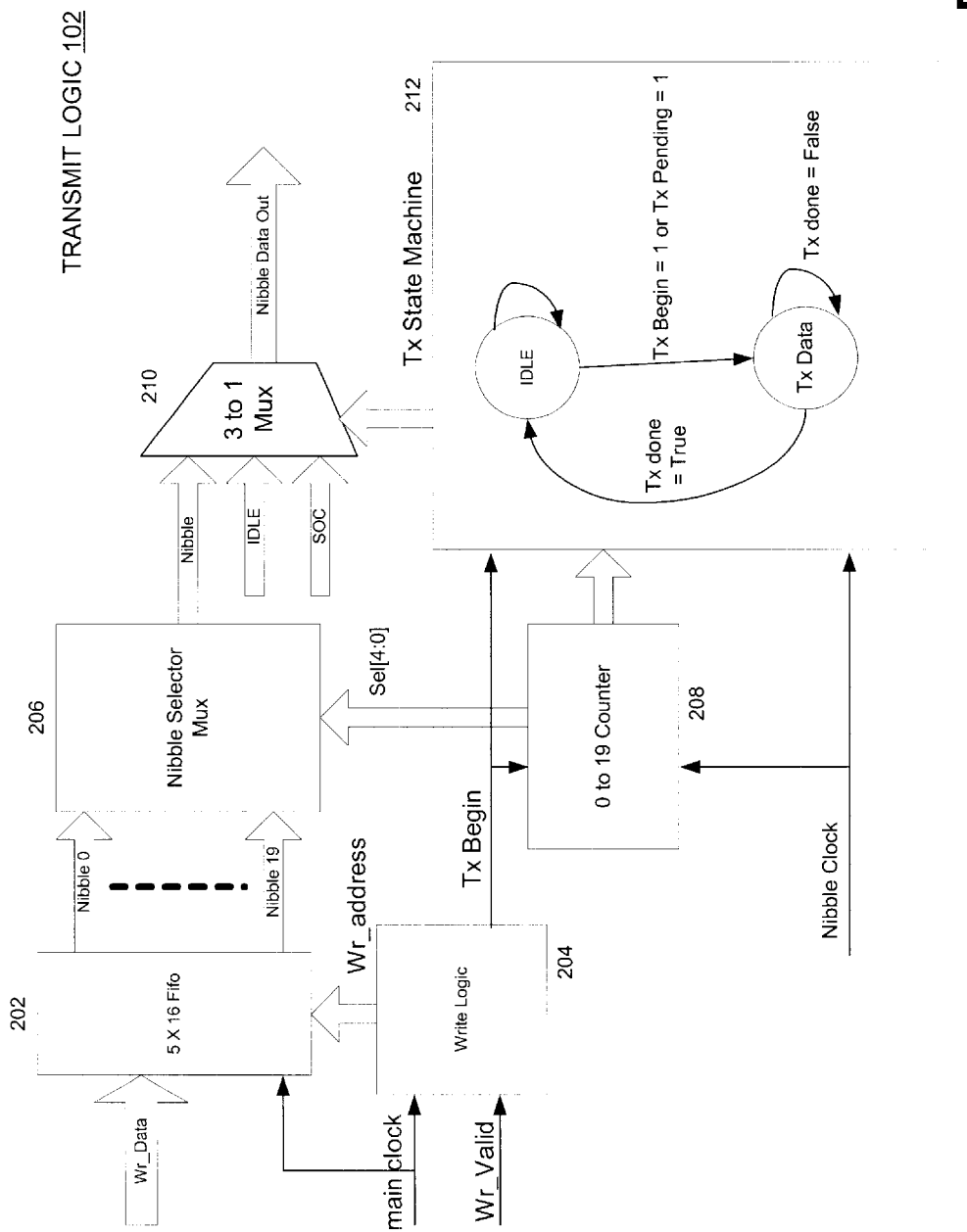
FIG. 2 is a block diagram of a transmit logic contained in the transmit section of the communications system of FIG. 1 configured in accordance with one embodiment of the present invention.

FIG. 2 illustrates the portion of transmit logic 102 used for a single nibble containing a 5×16 FIFO 202, a write logic 204, a nibble selector multiplexer (MUX) 206, a 0 to 19 counter 208, a 3 to 1 MUX 210 and a transmit state machine 212. The logic shown in FIG. 2 is replicated 8 times to transmit the 8 nibbles (e.g., a 32-bit wide word).

As a whole, transmit logic 102 functions to split the 32-bit wide stream into 8 nibble wide data streams. Transmit logic 102 encapsulates the nibble wide data stream with additional information using the following guidelines:
1) When there is no data to transmit, transmit logic 102 transmits an IDLE data pattern. In one embodiment, the IDLE pattern is 1000.
2) Data stream is divided into cells. Each cell is 20 nibbles long.
3) A data cell is always preceded with a start of cell pattern. In one embodiment, 0111 is used as start of cell (SOC) pattern.

This additional information enables the receive section in the destination IC to lock or align itself with the incoming data. At power up, transmit state machine 212 starts transmitting IDLE patterns. In the case of a continuous incoming data stream, transmit state machine 212 may transmit unlimited number of consecutive data cells with only the SOC pattern preceding each cell.

The write data (wr_data) is 16 wide because the data is generated by the main clock that runs at ¼$^{th}$ the frequency of the nibble clock. This is because the nibble clock is a high-speed clock and the rest of the logic needs to run at a much lower speed to meet timing requirements. When Wr_Data is valid, it writes 20 nibbles (5 main clock durations of 16 wide data) to 5×16 FIFO 202. Once a few nibbles have been written (3 in one embodiment), write logic 204 asserts the Tx Begin signal to transmit state machine 212 and 0 to 19 counter 208. 0 to 19 counter 208 now counts from 0 to 19 each time it receives the Tx Begin signal, selecting one of the 20 nibbles stored in 5×16 FIFO 202 (starting from nibble 0 sequentially) for transmission. Transmit state machine 212 takes care of inserting idle patterns through the use of 3 to 1 MUX 210 when there are no nibbles to be transmitted. Transmit state machine 212 also takes care of inserting the SOC patterns through the use of 3 to 1 MUX 210 before each valid cell is transmitted. 0 to 19 counter 208 and transmit state machine 212 runs off the faster nibble clock to maintain parity between the incoming and outgoing data rates.

A nibble to serial conversion device, i.e. demux logic, takes the nibble stream and produces a serial bit stream. At the receive logic, i.e. destination IC, a serial to nibble conversion device, i.e. mux logic, takes the incoming serial data stream and produces nibble wide data stream.

Figure 3:
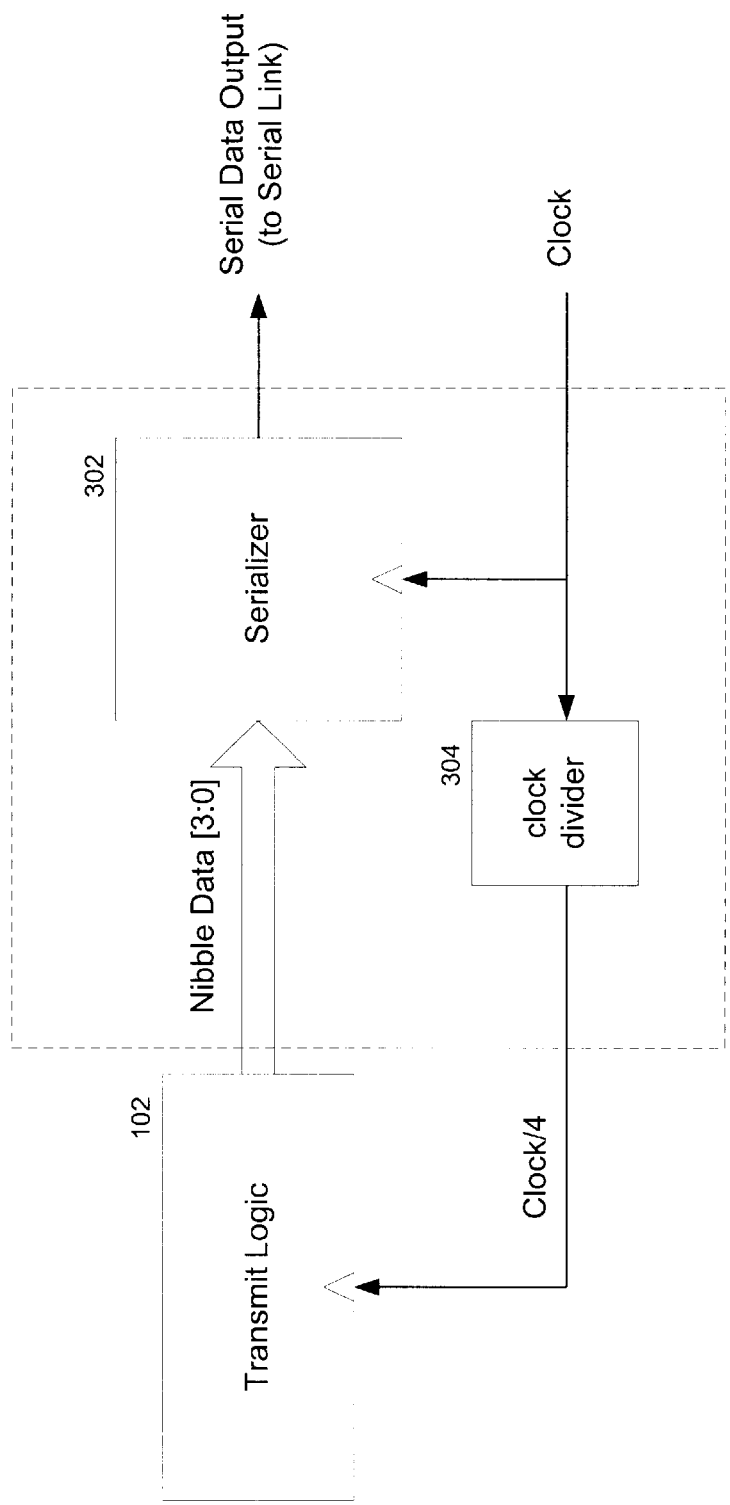
FIG. 3 is a block diagram of a nibble to serial converter contained in the transmit section of the communications system of FIG. 1 configured in accordance with one embodiment of the present invention.

FIG. 3 illustrates one nibble to serial converter 104 containing a serializer 302 and a clock divider 304. Nibble to serial converter 104 is coupled to transmit logic 102 to receive data in nibble form for processing into serial form.

Nibble to serial converter 104 converts the nibble data stream to a serial data stream so that it may be transmitted over a single wire. Nibble to serial converter 104 uses a clock that is 4 times the nibble data generation clock so that the incoming and outgoing data rates are matched. In one embodiment, nibble to serial converter 104 operates by transmitting bits 3, 2, 1 and 0 of the nibble data successively on each clock. Serializer 302 may be implemented using application specific integrated circuits (ASIC) from many vendors. One such ASIC is marketed by LSI Logic and identified as the LSI Logic CW900114 High speed Serializer.

Figure 4:
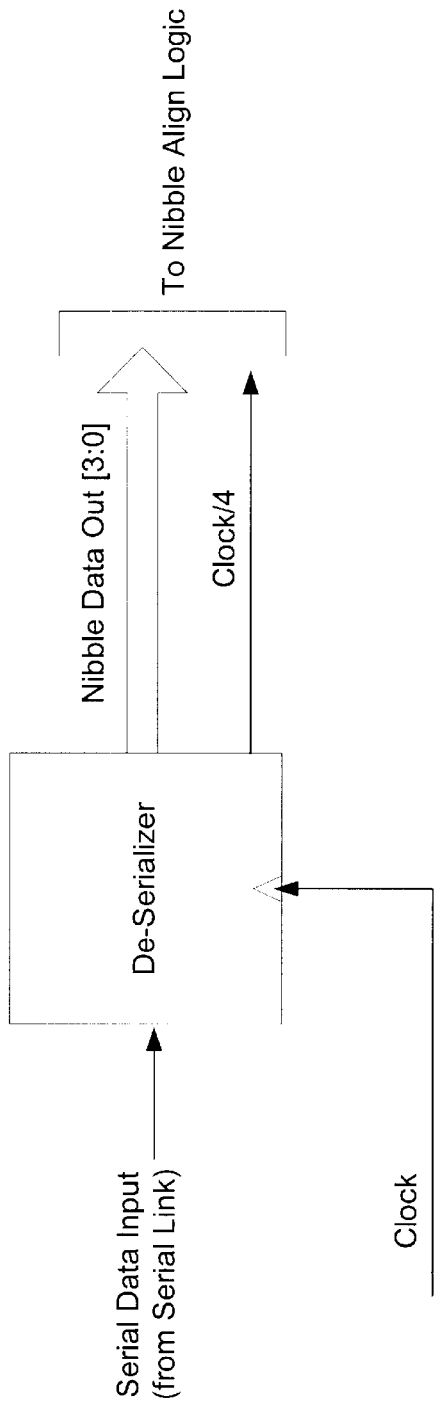
FIG. 4 is a block diagram of a serial to nibble converter contained in the receive section of the communications system of FIG. 1 configured in accordance with one embodiment of the present invention.

FIG. 4 is a diagram of serial to nibble converter (De-Serializer) 106, which converts the received serial data stream from the wire to a nibble-wide data stream. The basic function of serial to nibble converter 106 is the inverse of nibble to serial converter 104. Serial to nibble converter 106 accumulates received serial data into streams of 4-bit data. The outgoing clock frequency is one quarter of the incoming clock frequency to match the data rates. Nibble converter 106 may be implemented using ASICs from many vendors. One such ASIC is marketed by LSI Logic and identified as the LSI Logic CW900117 High speed De-Serializer.

Figure 5:
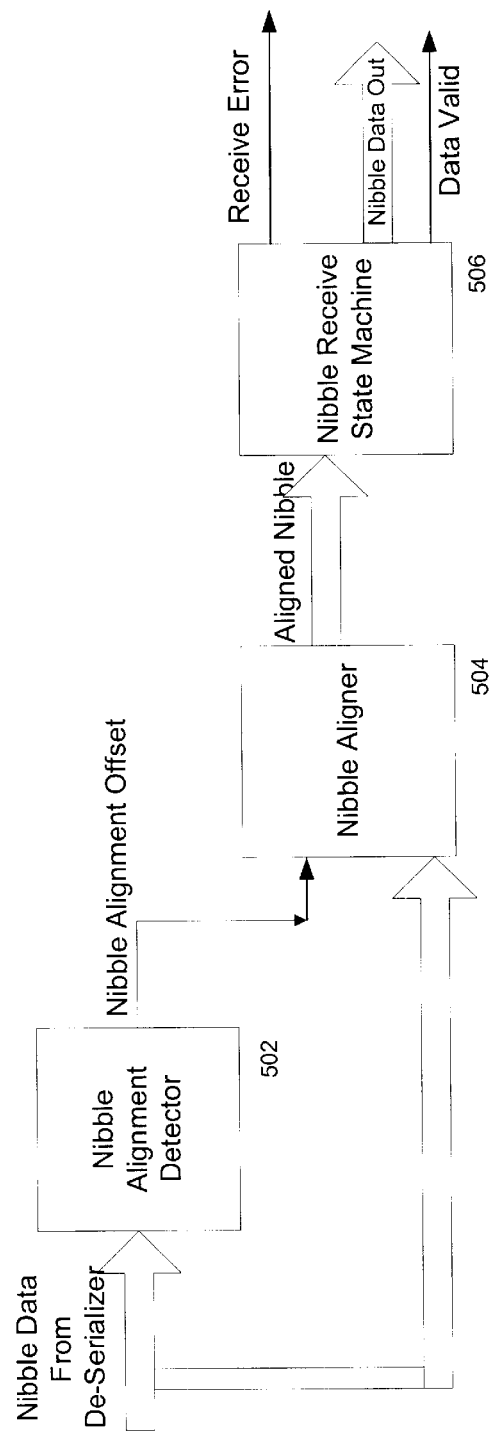
FIG. 5 is a block diagram of a nibble align logic contained in the receive section of the communications system of FIG. 1 configured in accordance with one embodiment of the present invention.

FIG. 5 is a block diagram of nibble align logic 108 having a nibble alignment detector 502, a nibble aligner 504, and a nibble receive state machine 506. Nibble align logic 108 is used to process one incoming nibble stream. The nibble stream generated by serial to nibble converter 106 is unusable because it is not nibble boundary aligned. Thus, nibble align logic 108 receives the nibble stream and reproduces the exact nibble stream transmitted by transmit state machine 212 of transmit logic 102. Nibble align logic 108 performs the following functions:
1) Take the nibble stream from serial to nibble converter 106 and reproduce a nibble boundary aligned nibble stream. After power up, nibble align logic 108 continuously looks for an IDLE pattern in the incoming data stream. The IDLE portion of the nibble stream from serial to nibble converter 106 can be misaligned from the actual nibble stream that is transmitted by transmit state machine 212 in three different ways, as shown in

TABLE 1

Misalignment Possibilities

| | Nibble Number | | | |
|---|---|---|---|---|
| | n | n + 1 | n + 2 | n + 3 |
| Actual IDLE stream | 1000 | 1000 | 1000 | 1000 |
| 1 bit misaligned | 0001 | 0001 | 0001 | 0001 |
| 2 bits misaligned | 0010 | 0010 | 0010 | 0010 |
| 3 bits misaligned | 0100 | 0100 | 0100 | 0100 |

Nibble align logic 108 continuously looks at two adjacent nibbles of the incoming stream to extract the first IDLE pattern. From the position of the extracted IDLE pattern, nibble align logic 108 determines how many bits misaligned the incoming nibble stream is from the actual nibble stream. For example, nibble align logic 108 looks at n and n+1 to determine the misalignment. After the misalignment determination, nibble align logic 108 continuously shifts the incoming data stream by that many bits and produces the actual nibble data stream.
2) Identify data in the incoming data stream and indicate it to the down stream logic. First, nibble align logic 108 locks into the incoming data stream by identifying the first IDLE pattern. Once it locks in, twenty nibbles followed by any start of cell pattern (e.g., 0111), in the data stream are considered valid data patterns.

3) Identify any data errors in the incoming nibble stream and indicate them, then gracefully recover from any incoming data errors and re-lock itself to the incoming data stream.

Nibble alignment detector 502 continuously looks at two adjacent nibbles of the incoming nibble to extract the first IDLE pattern. From the position of the extracted IDLE pattern, nibble align logic 108 determines how many bits misaligned the incoming nibble stream is from the actual nibble stream. This is called the nibble alignment offset, which is passed onto nibble aligner 504. In our implementation, the nibble alignment offset is generated following Table 2.

TABLE 2

Nibble Alignment Offset

| Successively Received Nibbles (MSB nibble received first) | Nibble Alignment offset |
|---|---|
| 10001000 | 00 |
| 00010001 | 01 |
| 00100010 | 10 |
| 01000100 | 11 |

Figure 6:
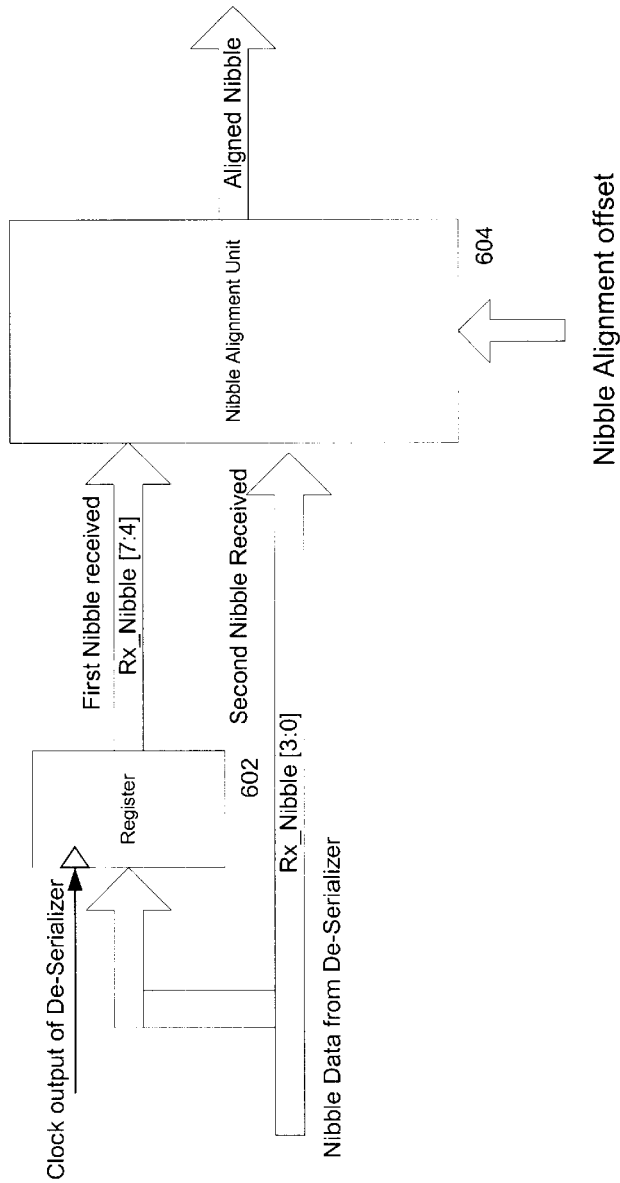
FIG. 6 is a block diagram of a nibble aligner logic contained in the nibble align logic of FIG. 5 configured in accordance with one embodiment of the present invention.

FIG. 6 is a diagram of nibble aligner 504 that containing a register 602 and a nibble alignment unit 604. Nibble alignment unit 604 uses the alignment offset information from nibble alignment detector 502 and two successively received nibbles to output an aligned nibble. This is because the transmitted nibble, if misaligned, would be spread across two successive incoming nibbles. In the figure below, the incoming nibble is registered to provide a one clock delayed version. This one clocked delayed nibble together with the new incoming nibble forms the byte that is input to the nibble alignment unit 604. Depending on the nibble alignment offset, nibble alignment unit 604 chooses a nibble stream subset of the byte to give the aligned nibble (as shown in Table 3). This aligned nibble will look exactly the same as the nibble that was transmitted.

TABLE 3

Aligned Nibble Determination

| Input Data | Nibble Alignment Offset | Aligned Nibble (output) |
|---|---|---|
| Rx_Nibble [7:0] | 00 | Rx_Nibble [7:4] |
| Rx_Nibble [7:0] | 01 | Rx_Nibble [4:1] |
| Rx_Nibble [7:0] | 10 | Rx_Nibble [5:2] |
| Rx_Nibble [7:0] | 11 | Rx_Nibble [6:3] |

Figure 7:
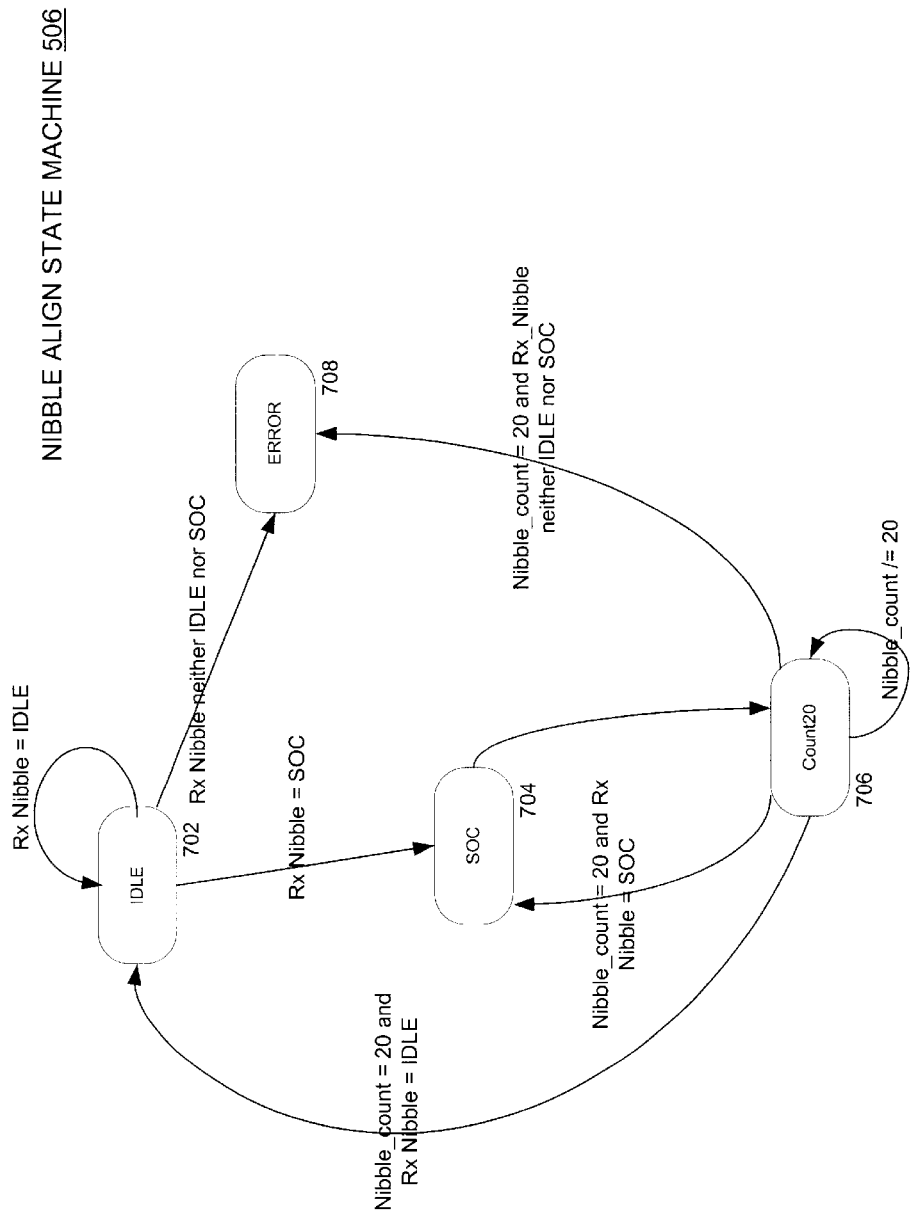
FIG. 7 is a block diagram of a nibble receive state machine contained in the nibble align logic of FIG. 5 configured in accordance with one embodiment of the present invention.

FIG. 7 is a state diagram illustrating nibble receive state machine 506, which analyzes the received nibble data to check for valid receive cells. Nibble receive state machine 506 identifies any data errors in the incoming nibble stream, gracefully recovers from any incoming data errors and re-locks itself to the incoming data stream. In this implementation, data stream can be divided into data patterns and non-data patterns. IDLE and start of cell pattern are categorized as non-data patterns. On reset or start-up, nibble align state machine 506 looks for a non-data pattern (which indicates the boundaries of the transmitted stream). During this period, if it receives any pattern other than a non-data pattern, it immediately indicates it as a data error. Also, it tries to re-lock itself to the incoming stream by identifying an IDLE pattern again. Once it identifies a start of cell pattern, the state machine asserts Data valid for the next 20 clocks, which is the duration to transfer a complete cell. Nibble align state machine 506 also stops decoding the next 20 nibbles for IDLE or start of cell patterns. It outputs these 20 nibbles of data and a Data Valid signal to the down stream logic. The 21st nibble pattern needs to be either an IDLE or another start of the cell pattern. If not, the state machine indicates it as a data error and tries to re-lock itself to the incoming data stream again.

Figure 8:
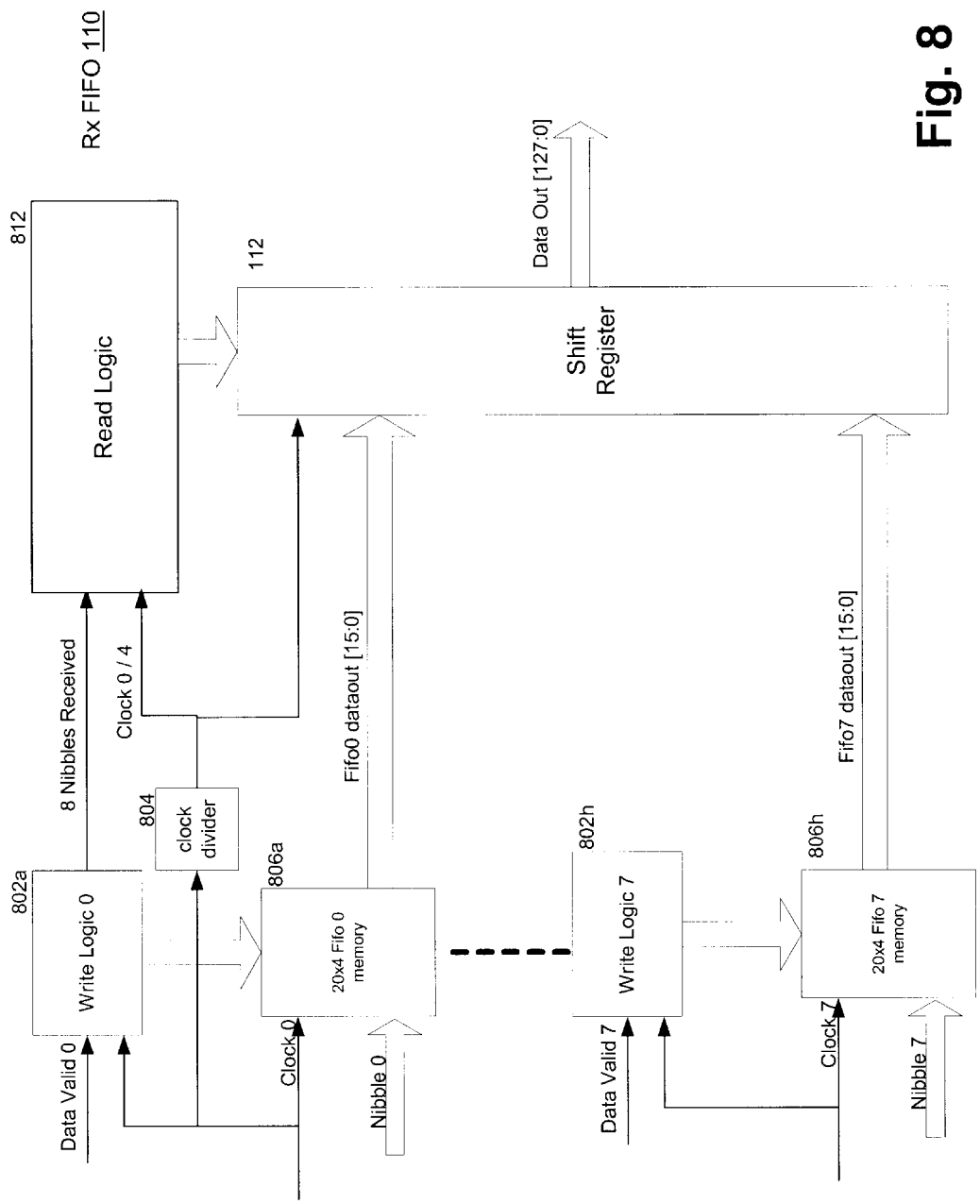
FIG. 8 is a block diagram of a receive first-in first-out logic contained in the receive section of the communications system of FIG. 1 configured in accordance with one embodiment of the present invention.

FIG. 8 is a block diagram of receive FIFO 110 containing a set of write logics 802a–802h, a set of 20×4 FIFO memory 806a–806h, a clock divider 804, and a read logic 812. The primary function of receive FIFO 110 is to join the eight incoming nibble streams to produce an aligned 32-bit wide data stream and, at the same time, account for the clock skews between the received nibbles. The 32-bit wide stream output should be exactly the same as the original 32-bit wide stream that was fed into transmit state machine 212.

Even though the nibble streams follow similar paths from transmit to receive; they could potentially be skewed by a few clocks due to such effects as asynchronous clock skews and propagation delay. In one embodiment, each 20×4 FIFO 806a–806h is 20-deep (one cell deep) and nibble wide (20×4). Only valid data patterns indicated by nibble align logic 108 are written into 20×4 FIFOs 806a–806h. In one embodiment, one of the eight nibble streams is designated as the primary nibble stream. The rest of the nibble streams will be considered secondary nibble streams. Read logic 812 initiates reading, starting from the top (location 0) of all 20×4 FIFO 806 blocks, only after 8 nibbles of data are written into the primary 20×4 FIFO 806a. This guarantees that primary 20×4 FIFO 806a has 8 valid nibbles of data and all secondary 20×4 FIFOs 806b–806h have anywhere between 3–13 valid nibbles of data (accounting for the maximum five clock skew between any two nibbles) by the time read logic 812 initiates reading. Read logic 812 reads four nibbles at a time from each 20×4 FIFO and shift register 112 combines the eight groups of four nibbles into 128-bit word. The FIFO logic needs to read four nibbles at a time to maintain data rate parity between input and output because read logic 812 and downstream circuitry operates on the clock divider output which is one quarter the nibble clock.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for transporting and aligning data across a set of serial data streams to a receiving device, the method comprising:

creating a predetermined number of data streams from a first data stream, the first data stream having a first predetermined bit width and each data stream of the predetermined number of data streams having a second predetermined bit width smaller than the first predetermined bit width;

inserting an alignment pattern in each of the predetermined number of smaller data streams for use in identifying bit misalignment of the smaller data streams at the receiving device, the predetermined number of smaller data streams being combinable into a data stream having the first predetermined bit width based on the alignment pattern; and preparing the predetermined number of smaller data streams for transmission.

2. The method of claim 1, wherein preparing the predetermined number of smaller data streams for transmission includes preparing the predetermined number of smaller data streams for transmission in a serial fashion.

3. The method of claim 1, creating the predetermined number of data streams from the first data stream includes generating each of the predetermined number of data streams from a portion of the first data stream.

4. The method of claim 1, where inserting the alignment pattern in each of the predetermined number of smaller data streams allows the combination of the predetermined number of smaller data streams using a first-in, first-out scheme.

5. The method of claim 1, wherein the destination is an integrated circuit targeted to receive the first data stream.

6. The method of claim 1, wherein the inserting of the alignment pattern includes inserting an IDLE pattern when there is no data to be transported.

7. The method of claim 1, wherein the second predetermined width is a nibble being 4-bits in length.

8. An article comprising a computer readable medium having instructions stored thereon which when executed cause:

creation of a predetermined number of data streams from a first data stream, the first data stream having a first predetermined bit width and each data stream of the predetermined number of data streams having a second predetermined bit width smaller than the first predetermined bit width;

insertion of an alignment pattern in each of the predetermined number of smaller data streams for use in identifying bit misalignment of the smaller data streams at a receiving device, the predetermined number of smaller data streams being combinable into a data stream having the first predetermined bit width based on the alignment pattern; and preparation of the predetermined number of smaller data streams for transmission to the receiving device.

9. The article of claim 8, where preparation of the predetermined number of smaller data streams for transmission includes preparation of the predetermined number of smaller data streams for transmission in a serial fashion.

10. The article of claim 8, where creation of the predetermined number of data streams from the first data stream includes generation of each of the predetermined number of data streams from a portion of the first data stream.

11. The article of claim 8, where insertion of the alignment pattern in each of the predetermined number of smaller data streams allows the combination of the predetermined number of smaller data streams using a first-in, first-out scheme.

12. An apparatus for transporting and aligning data across a set of serial data streams, the apparatus comprising:

a transmit logic;

a nibble to serial converter coupled to the transmit logic the nibble to serial converter converts a first nibble stream of data into a serial stream of data;

a serial to nibble converter coupled to the nibble to serial converter, the serial to nibble converter to produce a second nibble stream of data from the serial stream of data;

a nibble alignment circuit coupled to the serial to nibble converter the nibble alignment circuit to determine how many bits misaligned the second nibble stream of data is from the first nibble stream of data through analysis of Idle patterns extracted from the first nibble stream and the second nibble stream; and a memory coupled to said nibble alignment circuit.

13. The apparatus of claim 12, where the memory comprises:

a first-in first-out unit coupled to the nibble alignment circuit; and a register coupled to the first-in first-out unit.

14. An apparatus comprising:

a first converter to receive a serial stream of data based on a first stream of data being a bit width of at least four bits and to convert the serial stream of data into a second stream of data having a width of at least four bits; and an align logic coupled to the first converter, the align logic comprises a register and a nibble alignment unit to select bits from the second stream of data and a delayed version of the second stream of data, the align logic to determine how many bits misaligned the second stream of data is from the first stream of data and to align the second stream of data.

15. The apparatus of claim 14, wherein the bits comprise at least one bit from the second stream of data and at least one bit from the delayer version of the second stream of data.

* * * * *